US009363980B2

(12) United States Patent
Lander (10) Patent No.: US 9,363,980 B2
(45) Date of Patent: Jun. 14, 2016

(54) HOOF BOOT WITH PIVOTING HEEL CAPTIVATOR

(76) Inventor: Kirt Lander, Lake Havasu City, AZ (US)

(*) Notice: Subject to any disclaimer, the term of this patent is extended or adjusted under 35 U.S.C. 154(b) by 1146 days.

(21) Appl. No.: 11/516,914

(22) Filed: Sep. 6, 2006

(65) Prior Publication Data

US 2007/0113524 A1    May 24, 2007

Related U.S. Application Data (60) Provisional application No. 60/716,013, filed on Sep. 9, 2005, provisional application No. 60/762,070, filed on Jan. 25, 2006, provisional application No. 60/824,651, filed on Sep. 6, 2006.

(51) Int. Cl.
| | |
|---|---|
| *B68B 7/00* | (2006.01) |
| *B68C 5/00* | (2006.01) |
| *A01L 3/00* | (2006.01) |
| *A01L 5/00* | (2006.01) |
| *A01K 13/00* | (2006.01) |

(52) U.S. Cl.
CPC ............... *A01K 13/007* (2013.01); *A01L 3/00* (2013.01); *A01L 5/00* (2013.01)

(58) Field of Classification Search
CPC .... A01K 13/007; A01K 13/006; A01L 15/00; A01L 9/00; A01L 1/00; A01L 3/00
USPC ................................. 54/82; 36/111; 168/18, 1
See application file for complete search history.

(56) References Cited

U.S. PATENT DOCUMENTS

| | | | | |
|---|---|---|---|---|
| 115,311 | A * | 5/1871 | Halsey | 168/18 |
| 123,007 | A | 1/1872 | Edwards | |
| 181,750 | A | 8/1876 | Webber | |
| 275,872 | A | 4/1883 | Taylor | |
| 503,869 | A | 8/1893 | Munsey | |
| 538,685 | A * | 5/1895 | Larsen | 54/82 |
| 591,510 | A * | 10/1897 | Thurlow | 54/82 |
| 626,313 | A | 6/1899 | Stuart | |
| 752,090 | A * | 2/1904 | Miller | 168/18 |
| 830,403 | A * | 9/1906 | Barclay | 168/13 |
| 1,094,474 | A * | 4/1914 | Reece | 168/1 |
| 1,135,657 | A * | 4/1915 | Brenner | 168/1 |
| 1,395,689 | A * | 11/1921 | McKenzie | 54/82 |
| 1,434,275 | A | 10/1922 | Wozny | |
| 4,744,422 | A | 5/1988 | Dallmer | |

(Continued)

FOREIGN PATENT DOCUMENTS

| | | |
|---|---|---|
| GB | 339193 | 12/1930 |
| GB | 2128867 | 5/1984 |

*Primary Examiner* — Son T Nguyen
(74) *Attorney, Agent, or Firm* — Venjuris P.C.

(57) ABSTRACT

A hoof boot has a base, a heel captivator, and a pivoting mechanism that disposes the heel captivator to pivot relative to the base, preferably in a manner that allows the heel captivator at least three degrees of freedom of movement relative to the base. The heel captivator is preferably low in the rearmost portion, which provides clearance for the pastern bones of the equine lower leg to descend upon weight bearing during movement at various gaits. To reduce the possibility for bruising and chaffing of soft tissue around the pastern bones, and to help eliminate accumulation of debris, preferred heel captivators have an open mesh architecture. Heel captivators can alternatively or additionally be designed with fabric covered neoprene or other liners. Boots are preferably tightened using mechanically advantages laces.

38 Claims, 8 Drawing Sheets

(56) References Cited

U.S. PATENT DOCUMENTS

| | | |
|---|---|---|
| 5,661,958 A | 9/1997 | Glass et al. |
| 5,934,599 A | 8/1999 | Hammerslag |
| 6,192,989 B1 | 2/2001 | Tooman |
| D440,363 S | 4/2001 | Ford |
| 6,526,920 B1 | 3/2003 | Griffin |
| 7,032,367 B1 | 4/2006 | Yoho |
| 7,185,612 B2 * | 3/2007 | Faulk ............................ 119/850 |
| 2001/0056251 A1 * | 12/2001 | Peters ............................ 602/27 |
| 2004/0168813 A1 | 9/2004 | Ford |
| 2005/0066632 A1 | 3/2005 | Ford et al. ........................ 54/82 |
| 2005/0096576 A1 * | 5/2005 | Castro ............................ 602/27 |
| 2005/0150197 A1 | 7/2005 | Ford |
| 2005/0166556 A1 | 8/2005 | Ford |
| 2006/0064950 A1 | 3/2006 | Ford et al. |

\* cited by examiner

HOOF BOOT WITH PIVOTING HEEL CAPTIVATOR

This application claims the benefit of U.S. provisional application Nos. 60/716,013 filed Sep. 9, 2005, 60/762070 filed Jan. 24, 2006 and 60/824651 filed Sep. 6, 2006, incorporated herein by reference in their entireties.

FIELD OF THE INVENTION

The field of the invention is in equine footwear.

BACKGROUND

For centuries, humans have been nailing horseshoes to horses' feet as the most popular solution to protecting their hooves. But horseshoes are a very poor solution. Not only can a horseshoe constrict the natural growth of the hoof, but it can also restrict the natural expansion and conformance capability of the hoof during movement. This can reduce the hoofs ability to absorb shock, which can lead to injury of the delicate soft tissues and joints of the hoof and lower leg. The constricting effect of a horseshoe can cause contraction of the heel, which can lead to heel pain, severe lameness, and even loss of use. Further adverse effects include a lack of frog pressure and support necessary for proper circulation of blood.

In recent years many horse owners are favoring the more natural approach of having their horses go barefoot. Unfortunately, this can be also damaging to the hooves. Wild horses are able to keep their feet in good condition by being on the move constantly, but domestic horses tend to require ancillary protection for their hooves. Among other things they are not able to toughen their hooves within the confines of domestication, and often encounter hazardous and unnatural footing conditions when being ridden.

One solution is to have the horse wear hoof boots. Two examples in the patent literature are discussed in U.S. Pat. No. 5,661,958 (to Glass) and U.S. Design No. D440,363 (to Ford). These patents, along with all other referenced extrinsic materials, are incorporated herein by reference in their entirety. Where a definition or use of a term in an incorporated reference is inconsistent or contrary to the definition of that term provided herein, the definition of that term provided herein applies and the definition of that term in the reference does not apply.

Unfortunately, the known hoof boots tend to have poor conformation to different hooves, and tend to fall off the hooves upon extreme movements. For example, in the '958 and '363 designs, the boots retain the heel in place by gripping the very lowest portion of the heels with a strap, and using gripper teeth to bite into the hoof wall. The gripping and the grabbing, especially by the gripper teeth, can cause significant hoof wall damage. Also, this retention method only works on horses that have shoes nailed in place, or for barefoot horses where the hooves are foamed or glued into place. There is yet another problem in that the rigidity of the boot and its closed design tends to trap debris between the boot and the hoof during use. Once dirt and mud get inside a hoof, they can cause painful bruises on the sole of the foot. Thus, boots according to the '958 or '363 patents must be properly fitted, and must be frequently checked for debris.

U.S. Application No. 2004/0168813 (to Ford), 2005/0150197 (to Ford) and 2005/0166556 (to Ford) depict improved hoof boots that wear like a sneaker. Unfortunately, such boots provide insufficient pastern clearance. An additional problem is that the lace tension mechanism puts pressure right on the coronary band (horn to soft tissue juncture) which can damage the newly grown fresh hoof horn or the delicate coronary band itself. Still further, the '197 and '556 designs have not solved the problem of trapping debris, which as mentioned above, can damage the hooves.

Ford attempted to solve the problem of trapping debris by using a "gaiter," see publication 2005/0066632. But in actual usage such gaiters can actually collect debris and exacerbate the problem.

U.S. Pat. No. 4,744,422 (to Dallmer) provides a hoof boot with mountable belts. While the belts of this design are less rigid than an enclosed boot, they still do not provide adequate flexibility, and at the same time securely retain the hoof. In addition, the '422 design has insufficient clearance for the descending pastern bones, and is open on the bottom, thereby providing little protection to the sole of the horses hoof.

Thus, there is a need for a hoof boot that provides better conformance, retention of the hoof, and reduces entrapment of debris.

SUMMARY OF THE INVENTION

The present invention provides apparatus, systems and methods in which a hoof boot includes a base, a heel retention piece ("heel captivator"), and a mechanism that moveably couples the heel captivator to the base.

The base and other components of the boot can be made of any suitable substance or substance. Polymers are currently preferred, with the heel captivator being formed into a mesh with a plurality of holes. A liner underlying the heel captivator can be used to give extra protection. The sole of the boot preferably has a height of no more than 9 cm from the top of the sole The heel retention piece can be coupled to the base in any suitable manner. Preferred coupling mechanisms provide sufficient play to provide for freestanding up/down, and forward/rearward displacement of the heel captivator of at least 1.2 cm. An especially preferred coupling mechanism is a mechanically advantaged lacing system, with hook and loop fasteners. The lace preferably extends through a channel, and the pivoting mechanism comprises a restriction point where the lace exits from the channel. Such mechanisms are especially advantageously in that they allow the heel captivator at least three degrees of freedom of movement relative to the base.

The base of the boot can include a sole with a top, and the pivoting mechanism is preferably disposed at a restriction point within 2 cm from the top of the sole. In many cases the restriction point is also at least 4-6 cm rearward from the front of the base. In other aspects, the base can include a front and a back, and the pivoting mechanism can have a restriction point disposed rearward at least 50% of the distance between the front and the back. In still other aspects, the pivoting mechanism (which could be a hinge pin) can advantageously have a pivot or other restriction point within 2 or 3 cm of the back of the base. By moving the pin hinge forward toward the cable guides, the action of the pin hinged heel captivator will improve in a manner more in line with the non hinged version. As an extreme example, if the pin hinge were in perfect aft alignment, then the action of the heel captivator would be identical to the non-hinge pin version insofar as its ability to move with the foot. There is a sweet spot in this regard whereby a balance between movement, restriction and retention is achieved.

Tightening mechanisms are preferably mechanically advantaged in some manner, and can also include a ratchet. A tongue can advantageously underlie the tightening mechanism.

Various objects, features, aspects and advantages of the present invention will become more apparent from the following detailed description of preferred embodiments of the invention, along with the accompanying drawings, drawn substantially to scale, in which like numerals represent like components.

DETAILED DESCRIPTION

Figures 1, 2, 3:
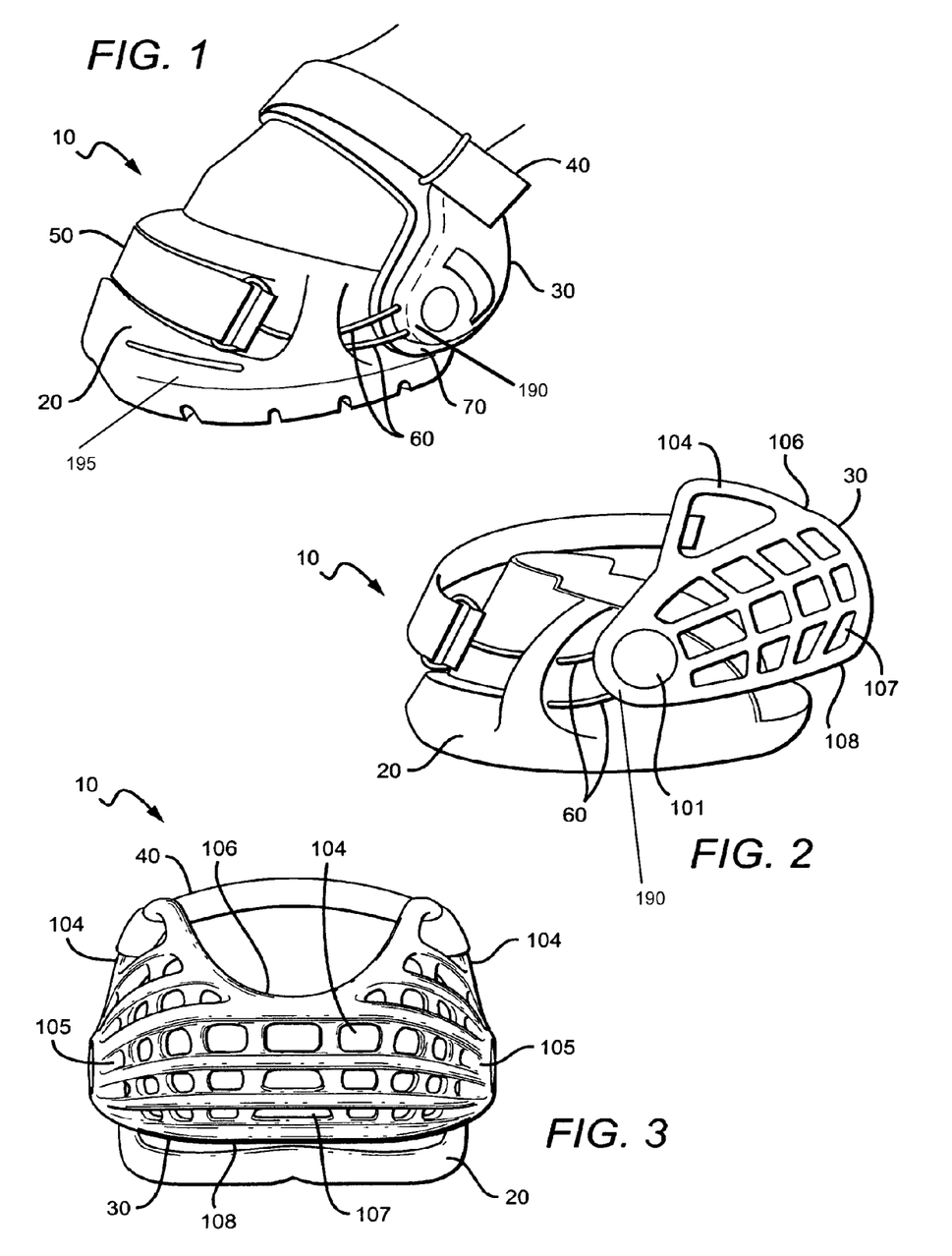
FIG. 1 is a side perspective of a hoof boot, fitted to a model of a hoof.
FIG. 2 is another side perspective of the hoof boot of FIG. 1.
FIG. 3 is a back view of the hoof boot of FIG. 1.

In FIG. 1, a hoof boot 10 generally comprises a base 20, a heel captivator 30, a keeper strap 40, a hook strap 50 with cables 60, and a liner 70.

As shown in FIGS. 2 and 3, a heel captivator 30 can comprise a single, contoured piece with an arch top 106, a strap holder portion 104 extending from a heel bulb 105 on each side of the heel captivator 30, an attachment position 101 on each side also extending from the heel bulb 105, and an edge 108. The strap holder portions 104 and the attachment positions 101 extending from a heel bulb 105 on each side of the heel captivator 30.

Figures 4, 5, 6:
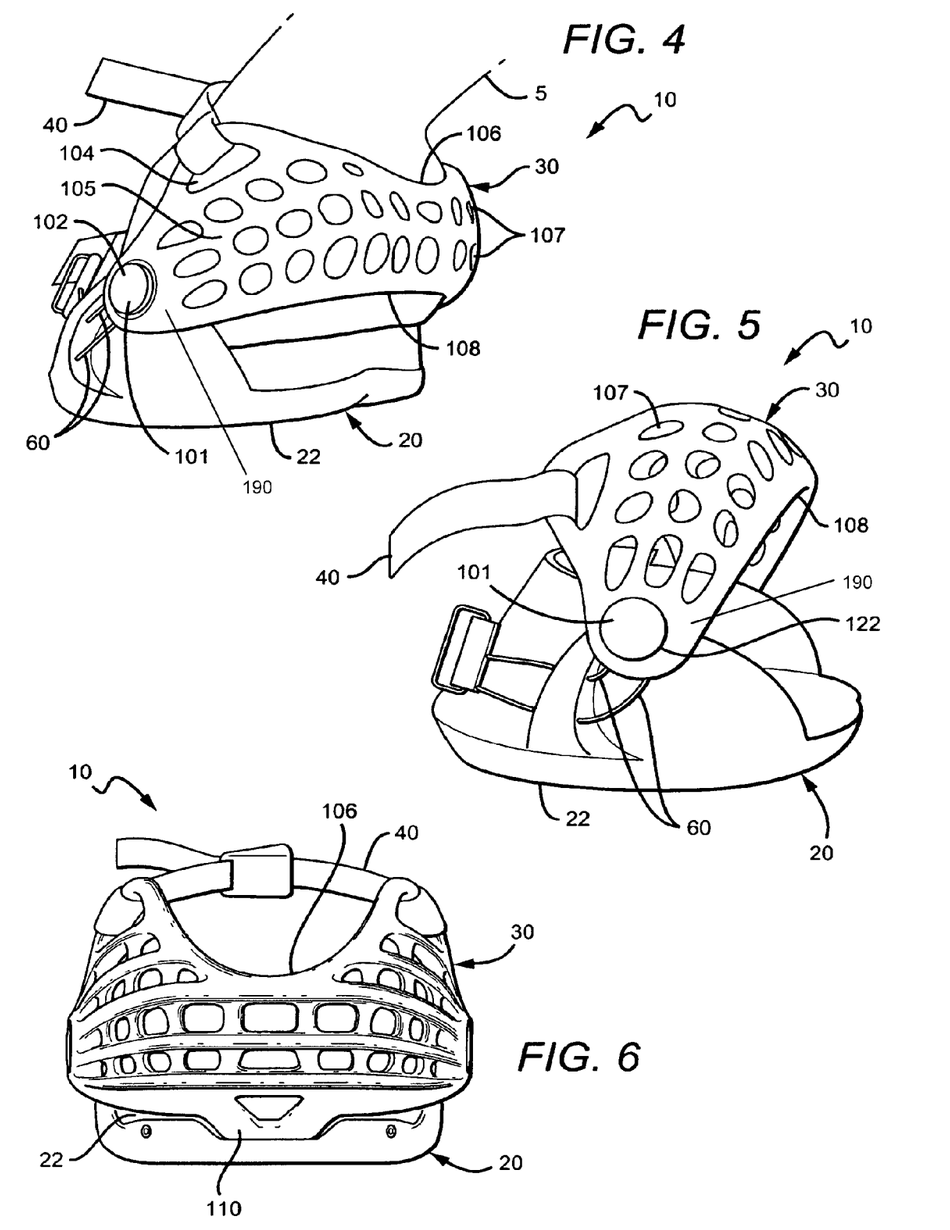
FIG. 4 is an implementation of the hoof boot of FIG. 1.
FIG. 5 is a side perspective of the hoof boot of FIG. 1., with the heel captivator in an up position.
FIG. 6 is a back view of the hoof boot of FIG. 1, identifying a hinge that attaches the heel captivator to the base.

The arch top 106 extends from one of the strap holder portions 104 to the other as seen in FIGS. 2 and 3. Preferably, the arch top 106 has a U-shape or other conformation that provides adequate clearance for the pastern bone region of the hoof as shown in FIG. 4. As discussed above, the pastern bones descend very low upon the weight bearing phase of a horse and can approach ground parallel angles or lower angles near or below ground surface, especially during elevated or faster gaits such as the extended trot, canter or gallop. The arch top 106 is advantageously contoured to the soft tissue of the pastern bones to allow for ample clearance of the pastern bones to descend, without impacting the bones and tendons, or abrading the soft tissue and lateral cartilages of the lower leg. Another advantage of the arch top 106 design in FIG. 4 is that it provides adequate closure and retention of the heel of the hoof within the boot.

Extending from the top arch 106 to the edge 108, the heel captivator has two heel bulb portions 105, one located on each side. In preferred embodiments, the heel bulb portions 105 are of a concave design that contours to the hoof of the horse, a cupped heel captivator. Of course, hoof boots for animals other than horses, could require different contours, and all such contours are contemplated since the present inventive subject matter contemplates applications to other hoofed animals, including especially mules and other equine animals.

Unlike the toe region of a hoof, the heel region comprises delicate soft tissue, tendons, cartilage structures, which encompass the majority of the heel and the lower leg. Conformability of the hoof boot in the heel region is important to reduce pressure points on the soft tissue, tendons, and lateral cartilages and will minimize the potential for bruising, chaffing, and abrasion of the hoof capsule. By contouring to the shape of the heel bulb, the heel bulb portions 105 advantageously provide conformable flexibility and comfort to the heel and retain the heel in the boot and can withstand tremendous forces that are applied to the heel inside the boot.

A strap holder portion 104 is located on either side of the heel captivator 30. The design of the heel captivator is an open mesh architecture. Preferably, instead of a closed continuous piece, the heel captivator 30 comprises different sized holes 107 throughout the piece. It is contemplated that the holes 107 are of a oval shape that average 1.5 cm×1.0 cm. Other shapes, such as rectangular, triangular or any irregular shapes are also contemplated. Similarity, the size of the holes can vary from small 0.1 cm diameter circles 5 cm diameter circles. The strap holder portions 104 are essentially two large holes that are can accommodate a keeper strap 30. They look like ears of the heel captivator. The advantage of the open mesh design allows for the escape of dirt and debris from the hoof. Enclosing or encasing the hoof inside of a closed boot can trap debris such as sand, rocks, dirt, gravel, water, mud, and snow, between the boot and the hoof during use. When debris is left in place for any length of time, damages ranging from bruising, chaffing, and abrasion can occur. This is especially problematic at the heel portion of the hoof as there is considerable soft tissue in this region. Thus, the open mesh design allows the debris to fall out of the boot instead of being trapped.

As shown in FIGS. 4 and 5, the edge 108 of the heel captivator is a straight edge that contours to the body of the heel captivator 30. In preferred embodiments, the edge 108 is open and disconnected to the bottom 22 of the base 20 of the heel captivator 30. The open nature of this interface between the heel captivator and the base further allow the ejection of debris. Those skilled in the art will appreciate that there is no attachment in the rearmost portion of the boot. The lack of attachment in the back of the boot allows the heel captivator to follow with the hoof and interface with the hoof in an intimate and well conforming manner minimizing concentrated pressure. This not only serves to minimize bruising and chafing but serves to maximize the holding and restraining capability of the heel captivator. As shown in FIG. 5, the hoof (not shown) in the boot 10 can pull out of the boot in an upward, outward, and downward manner without having uneven or concentrated pressure applied to heel captivator 30 as it interacts with and attempts restrain the caudal portion of the hoof.

Figure 7:
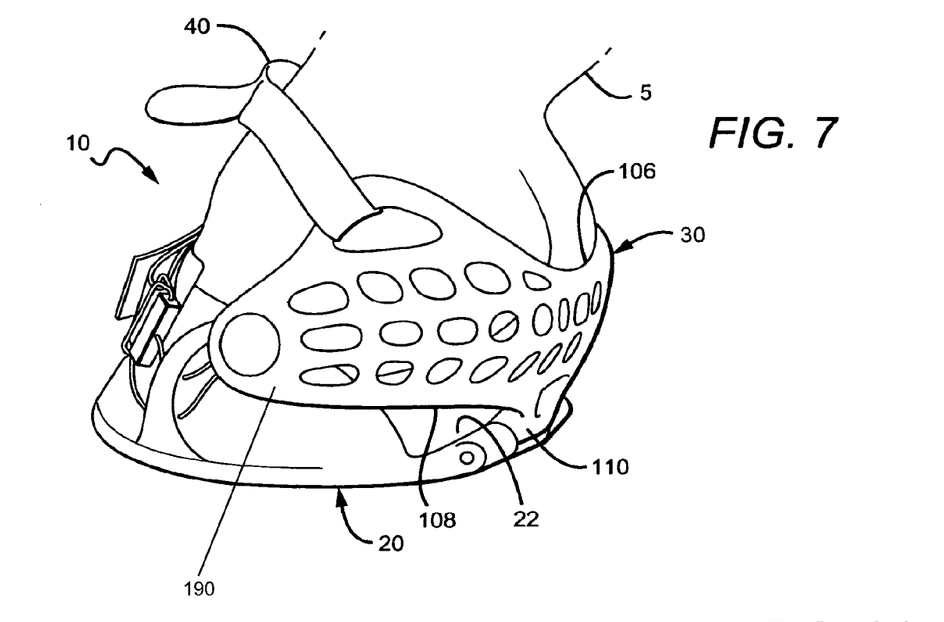
FIG. 7. is a side view of the hoof boot of FIG. 1, identifying a rearmost attachment point between the heel captivator and the base.

In an alternative embodiment shown in FIGS. 6 and 7, the heel captivator 30 is attached to the bottom 22 of the base 20 via a hinge 110. The hinge 110 rests in the center section of the edge 108 and is connected by inserting a steel rod (not shown) to an edge of the bottom 22. The hinge 110 is then pushed into the bottom 22 and the steel rod goes through both the bottom 22 and the hinge 110 to form a secure connection. The hinge action allows for flexibility of the heel captivator and permits the boot top to open wide making installation and removal of the boot much easier.

Horses can wear hoof boots with a hinged heel captivator in extreme conditions, such as trotting through heavy mud, deep snow, or other rough terrain, when the hooves need greater retention. In deep mud, for example, the vacuum or sucking action of the mud causes extreme force to act upon the boot which allows for undesirable movement of the boot in it's normal relationship with the hoof. In prior art boots, such forces can easily cause the boot to either come off partially or entirely.

But where the heel captivator is hinged to the base of the boot, the hoof must stay inside the boot. Even if the is trying to pull itself free from the boot, or for some other reason there is extreme erratic movement of the horse, or interference from the opposing hooves, the heel captivator with the hinge is free to move along with the hoof.

In both hinged and non-hinged embodiments of the present invention, the action of the boot can automatically adjust, and the boot base can automatically tighten, thereby increasing the holding and restraining power of the heel captivator creating a near impossibility of the boot inadvertently departing from the hoof.

Figure 17:
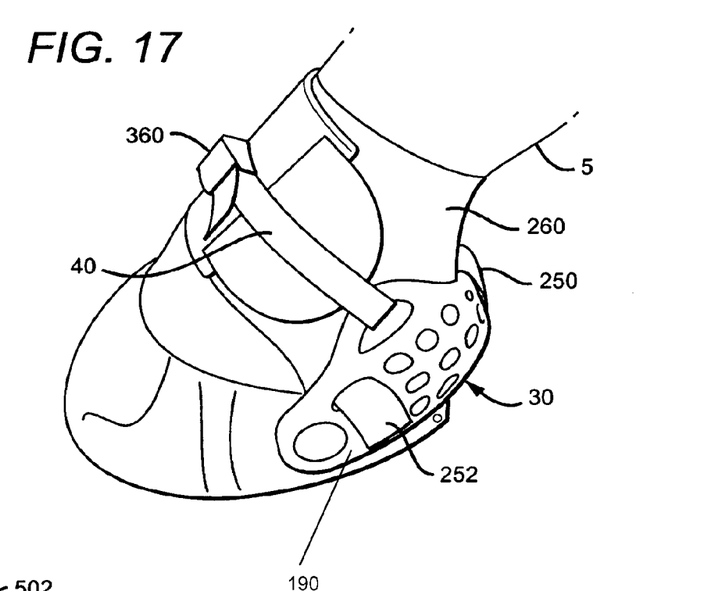
FIG. 17 is a perspective view of a hoof boot with an alternative liner.

In another alternative embodiment (see FIG. 17), the hinged version of the boot is combined with a full pastern wrap heel liner, and a keeper strap or pastern strap, to provide for even better foot and/or boot retention. This version is especially good at retaining the foot when the inside of the boot gets slippery, as in the case of use in deep mud or snow. With the use of the hinge and a pastern wrap, the heel inside the heel captivator is even more restricted than with an unhinged version.

A liner inside of the hinged boot can further prevent abrasion from the hoof moving relative to the heel captivator, in the same manner that a sock can help prevent the heel of a human from rubbing on the back of the heel part of a boot or shoe.

It should be appreciated that heel captivators as discussed herein can be designed to automatically adjust to the heel height of the hoof, which can vary from animal to animal. In addition, heel captivators can be shaped in a manner that provides intimate contact with the compound and bulbous contours of the caudal region of the hoof. Still further, heel captivators can be constructed of sufficiently flexible, pliable and conforming materials to further maximize the intimate contact, and reduce the possibility of concentrated pressure caused by variances in the contours of various hooves. Currently preferred embodiments include a one-piece molding from urethane, rubber or other elastomeric material, or a singular or composite of materials such as urethane, leather, rubber, vinyl, plastic, flexible plastic sheet, sponge neoprene sheet, heavy fabric or canvas, various cords, straps and or other textile materials. All of this minimizes or at least reduces the possibility of chafing and bruising.

Figure 8A:
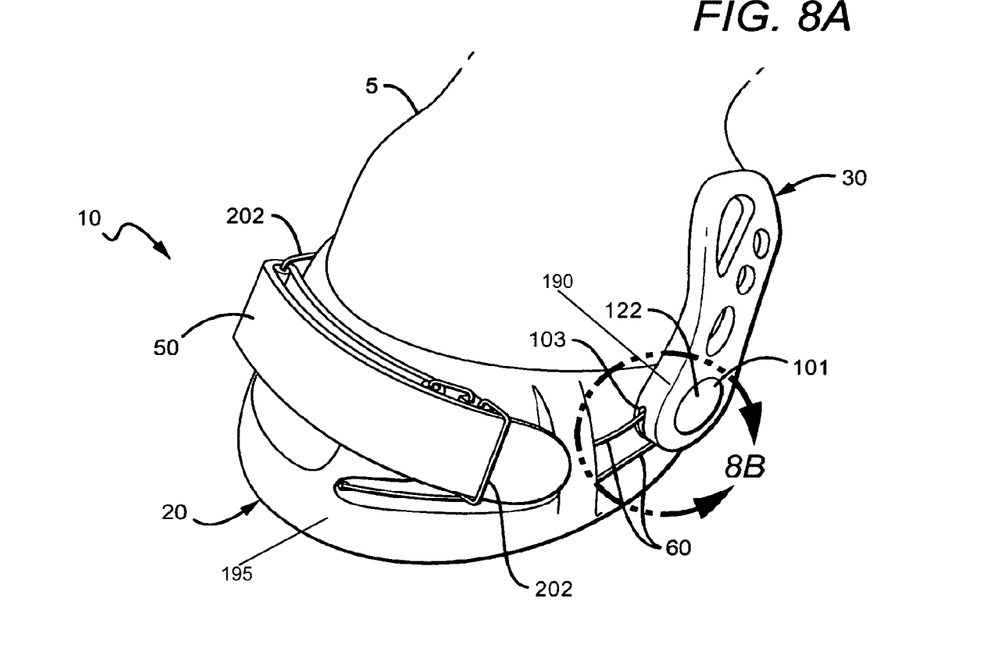
FIG. 8A is front side view of an alternative implementation of a hoof boot, fitted to a model of a boot.
Figures 8B, 9:
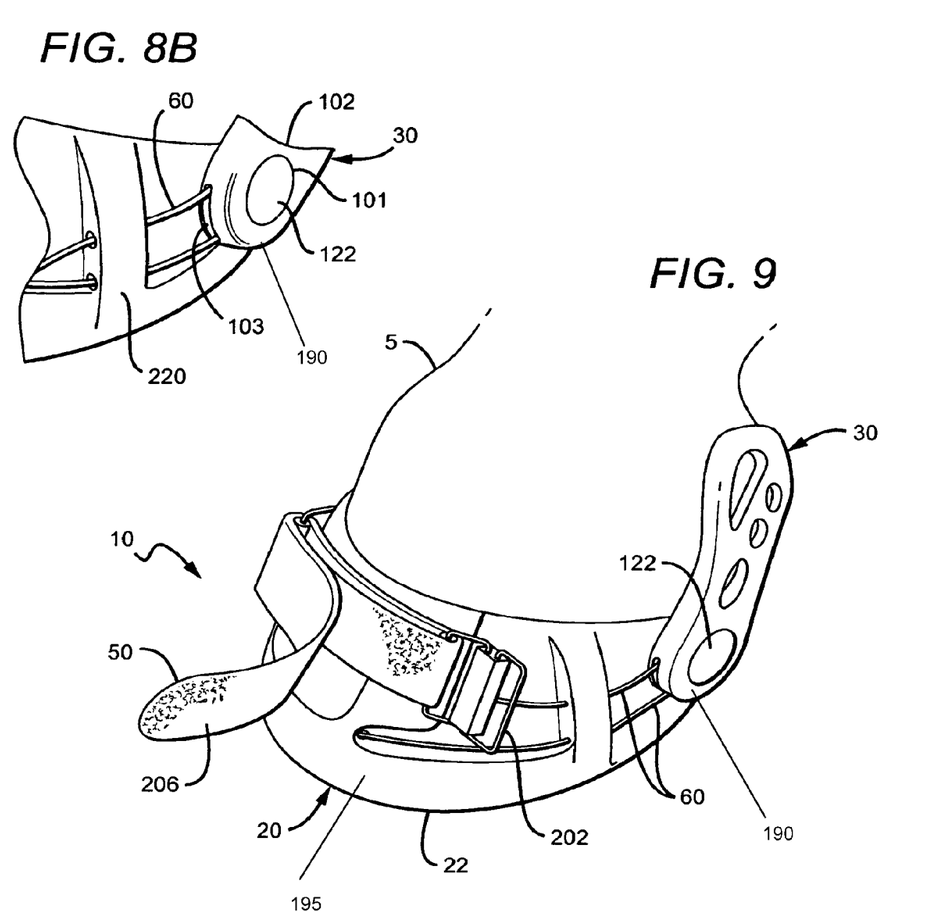
FIG. 8B is a close up view of a portion of the hoof boot of FIG. 8A.
FIG. 9 is a front side view of the hoof boot of FIG. 8A, showing the strap open.

In FIG. 8B, there are attachment positions 101 on both sides of the heel captivator 30. Conforming to the open design, the attachment positions 101 are preferably of a circular shape, and have a slot 103 on the side 102 of the heel captivator 30 where a cable pulley is inserted. This allows cables 60 to go through via the slot 103.

Figure 13:
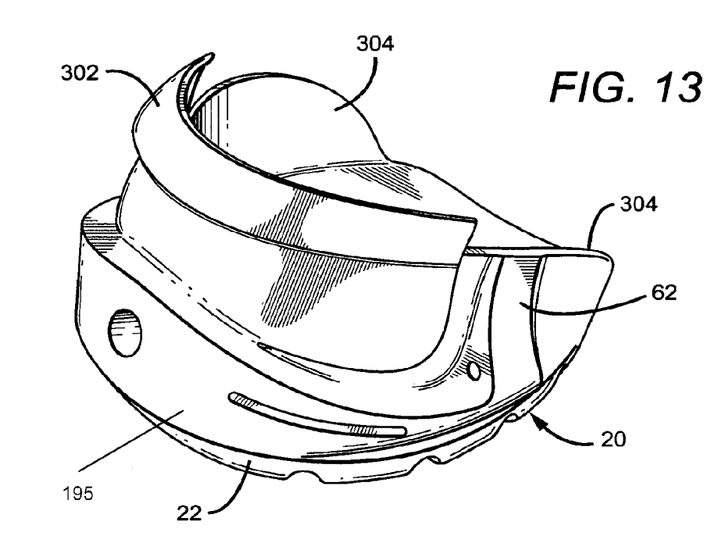
FIG. 13 is a rear side view of another alternative hoof boot.
Figure 14:
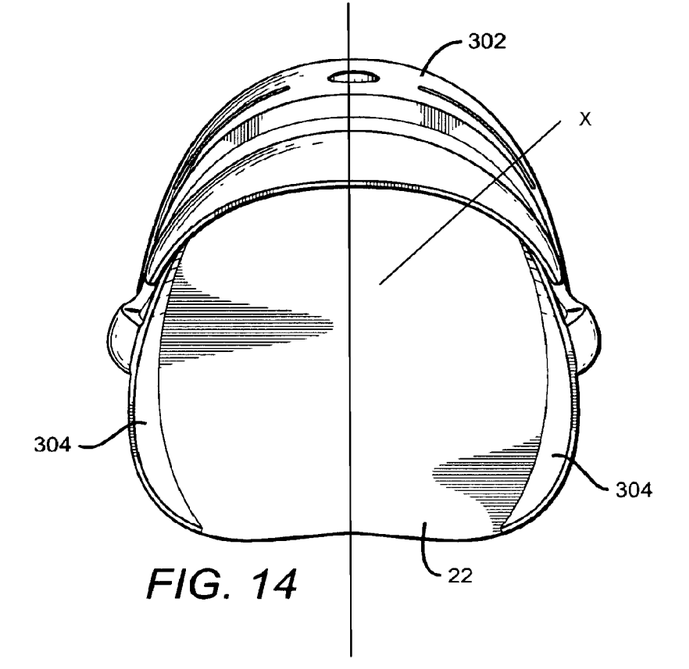
FIG. 14 is a top view of the hoof boot of FIG. 13.

In FIGS. 13 and 14, the base 20 of the boot comprises two sides 304, a front flap 302 and a bottom 22.

The sides 304 are conformed to the shape of the hoof and extends from the back of the boot and continues in a curved fashion on both edges of the boot to form a slope and round shape. On each outer surface of the edge, there is a cable guide 62. The cable guides 62 are protruded portions that comprise at least one hole on one side and two holes on the other to allow for the cables 60 to extend from the front to the heal captivator.

In preferred embodiments, the front flap 302 extends from the bottom 22 and covers the sides 304. To prevent damaging the soft tissues, the front flap 302 takes into consideration the hooves' structure. It is contemplated that the front flap 302 does not cover the top portion of the hoof wall. More preferably the front flap 302 sits below the horn juncture. The low design prevents the trapping of debris against the delicate soft tissues. Prior art stops at or near the soft tissue to horn juncture where the tough hoof wall horn is not fully developed. Having a higher frontal region also subjects the hoof to damages. Old boot shell can rise well above the horn juncture where it can trap debris against the soft tissue, causing bruising, chaffing and abrasions, especially when debris is trapped between the hoof and the boot.

One preferred embodiment has the front flap 302 acting like a tongue enclosed with overlapped sides. It is contemplated that the front flap is no higher than 10 cm, and preferably 9 cm. The lower design of the front flap allows for variances in hoof wall angle which permits the boot to conform well with the hoof wall. Hoof wall angels vary from hoof to hoof and from horse to horse. The thickness of the front flap is preferably no more than 1 cm. The minimal thickness in the toe region is desirable as it reduces the possibility of damage to the horse's hoof. The overlapping features of the front flap 302 to the sides forms a tight closure that serves to seal out debris. This overlapping front flap contrasts to the prior art which includes V cut interface between the adjustable portion and the front region or a bifurcated folding flap, which is generally loose and does not seal well.

The base of the boot can be constructed with any suitable material. Preferred embodiments include a flexable, tough, resilient and elastic material that would permit normal expansion and contraction of the hoof and at the same time allowing the blood in the hoof to circulate and to absorbs shock. It is contemplated that the material of the base should not appreciably hinder the hoof's natural movements, such as lateral vertical displacement as the hoof contacts on various terrain. It is important to prevent the bones, joints, ligaments, tendons and other connective tissues in the foot and lower leg of the horse from being overloaded. It is also contemplated that the base can be of a variety of colors and owners can decorate the base with different features, such as glitters and rhinestones.

Currently preferred embodiments include a one-piece molding from an polymeric substance or elastomeric material of 40 shores D hardness. It is contemplated that other materials are possible. Materials such as urethane, rubber or other elastomeric material, or a singular or composite of materials such as urethane, leather, rubber, vinyl, plastic, flexible plastic sheet, sponge neoprene sheet, heavy fabric or canvas, various cords, straps and or other textile materials can be used.

Figure 18:
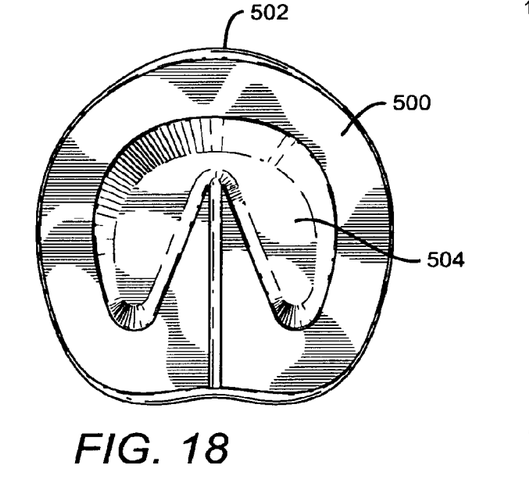
FIG. 18 is a bottom view of a sole of a hoof boot.

The sole 500 as shown in FIG. 18 preferably is a shape similar to that of a horse's bare hoof. In preferred embodiments, the sole 500 features a prominent outer rim 502 and a frog pressure zone 504 tapered away from the ground towards the center of the boot. Frog pressure is especially important for preserving proper hoof expansion and contraction during loading and unloading. The shape allows the boot to preserve the natural ground pressure and traction capabilities of the bare hoof while wearing the boot.

Figure 11:
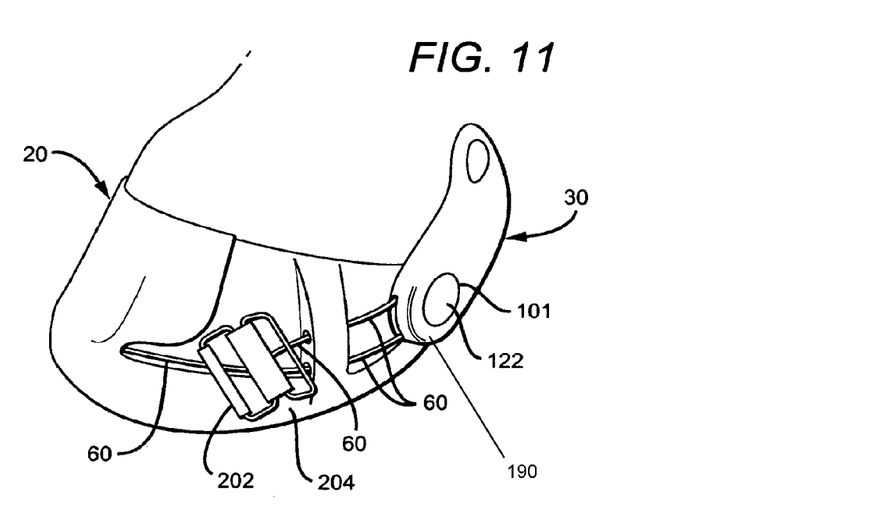
FIG. 11 is a front side view of the front base of another alternative hoof boot, showing a tensioning buckle.
Figure 19:
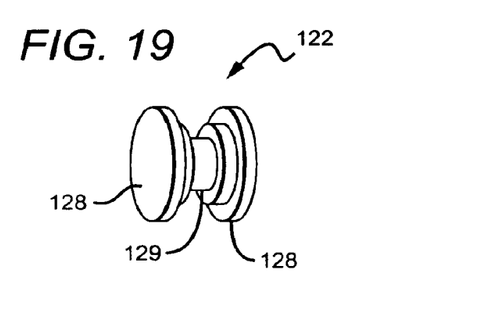
FIG. 19 is a front view of a cable pulley knob of a hoof boot.

In preferred embodiments, the heel captivator 30 is attached to the base at attachment positions 101 depicted in FIGS. 1, 2, 4, 5, 9, 11, and 12 in a pivoting motion. The pivoting motion includes use of sloppy pivots that have more than a rotational freedom of movement and allows the heel captivator in all directions. In FIGS. 11 and 19 the cable pulley block 122 comprises two end pieces 128 and a connecter 129 about which the cable is disposed. As shown in FIGS. 8B and 11, the cables 60 go through the cable guides 220 to the front 195 of the base 20 and allow the heel captivator to have elasticity upon wearing. Preferably, the cables 60 extend through the cable guides 220 to the front 195 of the base, crossing over to the opposing side. The mechanically advantaged cable lacing pathway reduces the tension forces required of the cable tension mechanism, by virtue of the cables passing through and around the cable pulley. Use of a mechanically advantaged pathway also serves to reduce the effort required of the user in tensioning the lacing system, thereby eliminating the need for geared or similar systems.

The cable pulley block 122 is preferably designed flush with generally contour of the heel captivator. Cable pulley block 122 can be made of any suitable material, including plastics. Other types and modes of attachments can alternatively or additionally be used.

Preferably, cables 60 are made of stainless steel, but other types of resilient, flexible and durable wires are contemplated. In preferred embodiments, the diameter of the wires are no larger than 1 cm.

The cable tension mechanism, also known as the coupling system, provides sufficient freestanding up/down and forward/backward displacement of the heel captivator of at least 0.5 cm, preferably 1.0 cm and most preferably 1.2 cm.

In an especially preferred embodiment, the cable originates from the cable tension mechanism at or near the upper portion of the tongue, passes rearward through the lateral cable guides, around the cable pulley block located on the forward distal ends 190 of the heel captivator, then forward through the lateral cable guide, and further onto the toe cable guide, crossing over to the opposing side and ditto for the other side. This pathway serves to reduce the tension forces required of the cable tension mechanism by virtue of the cable passing through and around the cable pulley block. The use of pulley systems to increase mechanical advantage is well understood and its employment here serves to reduce the force required of the end user to tension and secure the lacing cables, whether the boot is deployed with a ratcheting cable spool/drum, or a hook and loop fastener strap, or some other means of tensioning and securing the laces. The use of a mechanically advantaged tensioning system is also advantageous because it mitigates a dis-advantageous loosening which would tend to occur in a direct tensioning system.

FIG. 4 shows the perspective view of the cable tension mechanism in action. It shows how the heel captivator can pivot freely along with the hoof during extreme movement by allowing the heel captivator to not only restrain the hoof within the boot but provide enough lateral movement with respect to a longitudinal axis X (FIG. 14) of the boot and up and down movements for the hoof to move freely. The cables increase in tension in unison with the upward movement of the hoof which in turn increases holding pressure of the heel captivator, further minimizing the possibility of the hoof inadvertently separating from the boot during use.

The heel captivator 30 can be attached to a boot base by any suitable means, including, for example: adjustable cables, cords, straps or other similar structures. Preferred heel captivators emanate only from the forward lateral distal ends 190 of the heel captivator, and then pivots to the lateral region of the boot base with no other direct attachments thereunto. This method of attachment permits the heel captivator to move freely along with the hoof as the hoof moves about in relationship to the boot during use which enables the heel captivator to retain maximum and intimate contact with the hoof enabling maximum effectiveness in retaining the boot upon the hoof.

As shown in FIG. 5, a preferred heel captivator can be loose and free to move, flex and adjust upwardly which allows the heel captivator to conform to various heel heights of the hoof which can vary from hoof to hoof and from animal to animal. This is in contrast to prior art designs which have the heel captivator attached to the rearmost portion of the boot that requires a constant adjustment of the boot. Many fittings are also required to find the appropriate size for the hooves. It is contemplated that heel captivators can be designed to require no adjustment or fitting whatsoever, and instead automatically adjust to varying heel heights when installed upon the hoof for use. Additional benefit to this automatic adjustability is the fact that a hoof can vary in it's heel height from day to day, week to week and month to month making boots that require adjustments or changing of parts inconvenient to use as the heel height adjustment needs to be addressed to conform with the potentially frequent variability of any particular hoof.

On the front of the boot base, a hook strap and loop fastener are employed to house the cable tension mechanism. FIGS. 8A and 9 show a hook strap 50 on the base 20 with buckle adapter 202 on either side.

Figure 10:
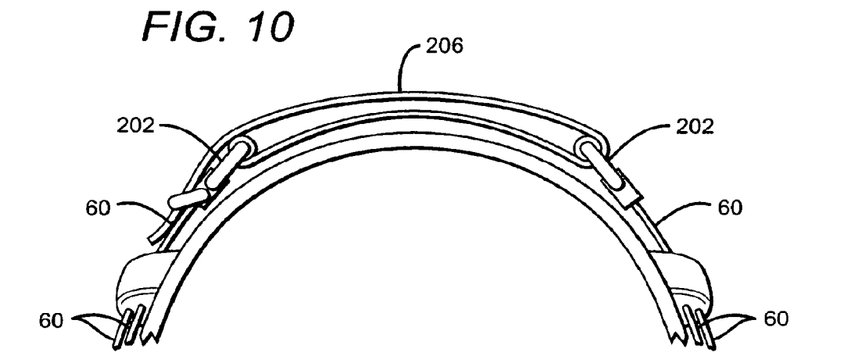
FIG. 10 is a top view of the front base of the hoof boot of FIG. 8A.

In preferred embodiments, the hook strap 50 is one continuous material 206 that folds into two layers as shown in FIGS. 10 and 11. The hook strap first wraps around the buckle adapter 202 on both sides for a secured connection, then the hook strap goes through the outer portion of the buckle adapter and straps across the bottom layer. The inner surface of the layers comprises an adhesive material, preferably a Velcro™ or other hook and loop material that allows the two layers to fasten to each other and form a tight connection. This mechanism is similar to the cable tension mechanism in that the hook strap allows for elasticity and adjustment without causing damage to the boot and hoof.

The hook strap is made of any suitable strap materials that are resilient, durable and easy to use. Preferred materials include plastics with an adhesive portion, or a hook and loop arrangement that allows attachment to attach to itself.

Figure 12:
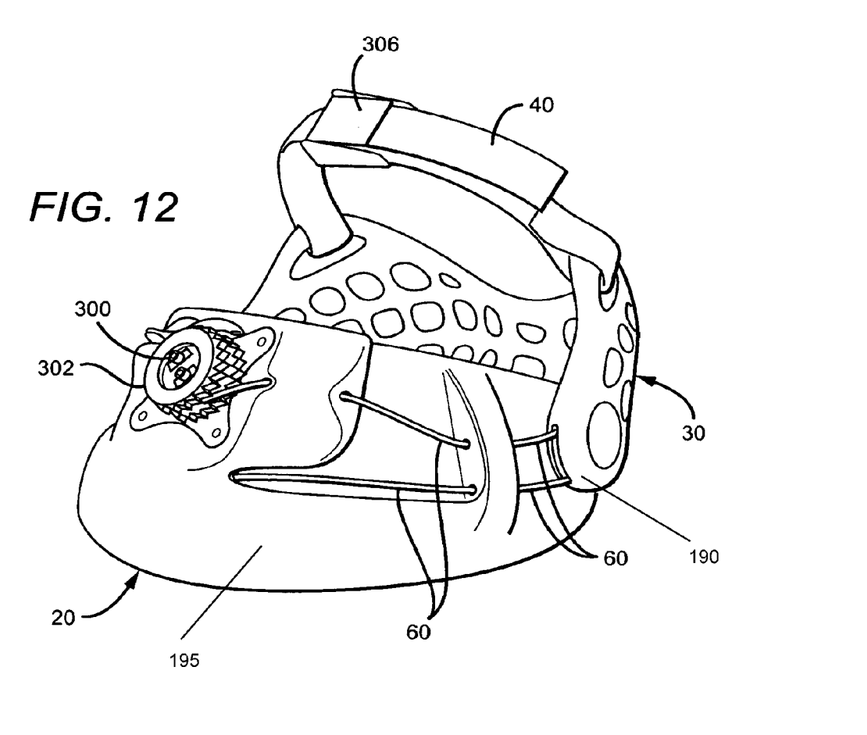
FIG. 12 is a front side view of the front base of another alternative hoof boot, showing a tensioning dial.

An alternative embodiment of the front tension mechanism is shown in FIG. 12. Instead of a hook strap and buckle adapter system, this embodiment employs the use of winding knob 300. The winding knob 300 works like a cable spool where the base plate engages the ratchet pawl 302 and rotates the winding knob clockwise until the desired tension is achieved. By moving the winding knob 300 in the opposite direction, the tension is released. This not only serves to release all of the cables from the winding knob, but also helps to eject dirt and debris from under and around the mechanism and makes cleaning easy with a simple brush.

The winding knob 300 uses a "pop up" action to release and wind the cables 60. The mechanism could be closed, but is preferably an open system that continues to function in the presence of dirt and debris.

In preferred embodiments, a keeper strap 40 couples to heel captivator 30 through strap positions 104. The keeper strap 40 keeps the pastern bone intact which enhances boot retention during use, especially in extreme conditions, such as galloping in deep water, snow or mud. Preferably the keeper strap is made of nylon or other suitable materials that can be adjusted and released by means of a cam lock buckle 306 or a hook and loop fastener.

Figure 15:
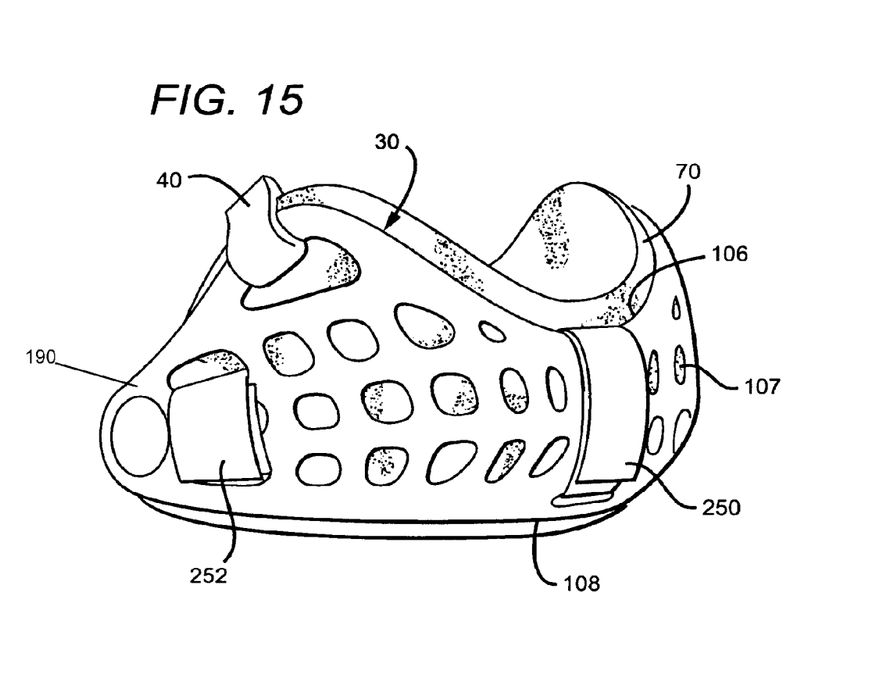
FIG. 15 is a back side view of a heel captivator.
Figure 16:
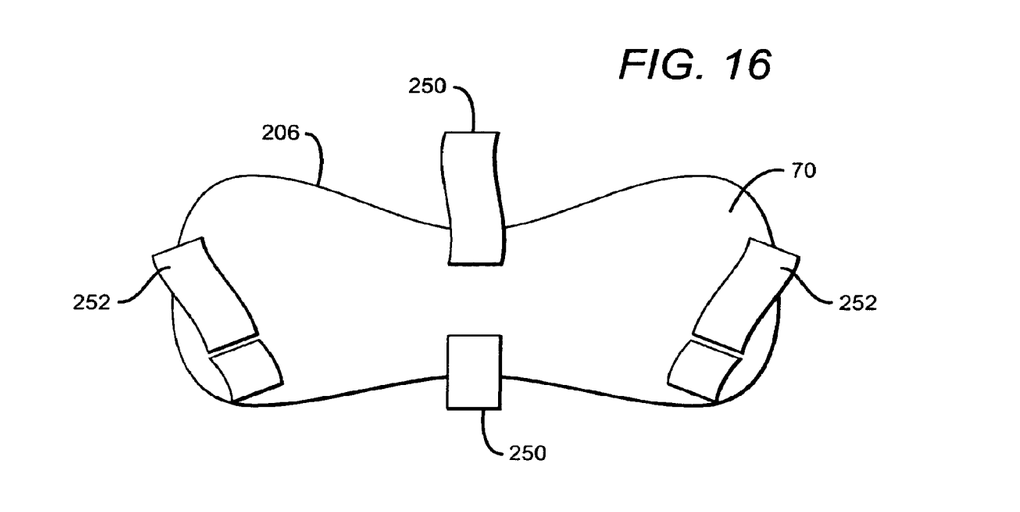
FIG. 16 is a perspective view of a hoof boot liner.

In yet another preferred embodiment, an optional liner 70 as shown in FIGS. 15 and 16 can be inserted in the heel captivator for added cushion. Preferably neoprene is used, but other suitable material and fabric that are comfortable and form-fitting are contemplated, including viscoelastic foams. The liner 70 has a middle strap 250 and two side straps 252 that can be secured through the holes of the heal captivator 30. The straps can use Velcro™ or other suitable fastener means to attach to the heal captivator. The liner provides comfort to the hoof without causing chafing and abrasion to the region. It can be quickly and easily installed or removed with the strap or hook and loop fastener.

In yet a further preferred embodiment, the liner 70 has holes that correspond with the open mesh of the heel captivator to release debris that is trapped in between the boot and the hoof. Various sizes are contemplated for the liner. Depending on the size, the liner can be wrapped across the front, lateral, all other directions of the pastern bone. Different shapes are also contemplated, including a full height liner shown in FIG. 17. The keeper strap 40 can keep the liner in tact over the pastern bone region of the hoof.

Thus, specific embodiments and applications of the boot have been disclosed. It should be apparent, however,to those skilled in the art, that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps can be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

What is claimed is:

1. A hoof boot for placement on a hoof, the boot comprising:
    a base wherein the base at least partially covers lateral and anterior surfaces of the hoof;
    wherein the base has sides and includes a front, a back, and a bottom;
    a cupped heel captivator wherein the cupped heel captivator includes forward lateral distal ends;
    a coupling mechanism for coupling the base to the forward lateral distal ends of the cupped heel captivator wherein the coupling mechanism includes at least one tension element wherein the tension element passes through at least one restriction point;
    wherein the at least one restriction point is located a distance at least 2 centimeters forward from the back of the base; and
    wherein when coupled under tension, the coupling mechanism provides movement of the cupped heel captivator forward and backward relative to the base.

2. The boot of claim 1 wherein the at least one restriction point is located between a distance at least 4 centimeters rearward from the front of the base and 2 centimeters forward from the back of the base.

3. The boot of claim 1 wherein the at least one restriction point is located a distance between 4 and 6 centimeters rearward from the front of the base.

4. The boot of claim 1 wherein the at least one restriction point is located a distance between 3 centimeters forward from the back of the base and 6 centimeters rearward of the front of the base.

5. The boot of claim 1 wherein the at least one restriction point is located a distance rearward at least 50% of the distance between the front of the base and the back of the base.

6. The boot of claim 1 wherein the at least one restriction point is coupled to the side of the base.

7. The boot of claim 1 wherein the base comprises a polymeric substance.

8. The boot of claim 1 wherein the heel captivator includes a mesh with a plurality of holes.

9. The boot of claim 1 further comprising a lining underlying the heel captivator.

10. The boot of claim 1 wherein the heel captivator moves forward and backward relative to the base after coupling.

11. The boot of claim 1 wherein the heel captivator moves forward and backward relative to the base after coupling when said coupling mechanism is under tension.

12. The boot of claim 1 wherein the coupling mechanism is a pivoting mechanism.

13. A hoof boot for placement on a hoof, the boot comprising:
    a base wherein the base at least partially covers lateral and anterior surfaces of the hoof;
    wherein the base has sides and includes a front, a back, and a bottom;
    a cupped heel captivator wherein the cupped heel captivator includes forward lateral distal ends;
    a coupling mechanism for coupling the base to the forward lateral distal ends of the cupped heel captivator wherein the coupling mechanism includes at least one tension element wherein the tension element passes through at least one restriction point;
    wherein when coupled under tension, the coupling mechanism provides movement of the cupped heel captivator forward and backward relative to the base.

14. The boot of claim 13 wherein the at least one restriction point is located a distance 50% of the distance from the front of the base to the back of the base.

15. The boot of claim 13 wherein the at least one restriction point is coupled to the side of the base.

16. The boot of claim 13 wherein the base comprises a polymeric substance.

17. The boot of claim 13 wherein the heel captivator includes a mesh with a plurality of holes.

18. The boot of claim 13 further comprising a lining underlying the heel captivator.

19. The boot of claim 13 wherein the heel captivator moves forward and backward relative to the base after coupling.

20. The boot of claim 13 wherein the heel captivator moves forward and backward relative to the base after coupling when said coupling mechanism is under tension.

21. The boot of claim 13 wherein the coupling mechanism is a pivoting mechanism.

22. A hoof boot for placement on a hoof, the boot comprising:
- a front and a back;
- a base including a bottom, wherein the bottom substantially covers the entire bottom surface of the hoof and wherein the base at least partially covers lateral and anterior surfaces of the hoof;
- a longitudinal axis extending between the front and the back of the boot;
- a cupped heel captivator wherein the cupped heel captivator includes forward lateral distal ends;
- a coupling mechanism for coupling the base to the forward lateral distal ends of the cupped heel captivator;
- wherein the cupped heel captivator is coupled to the base and the cupped heel captivator moves laterally relative to the longitudinal axis of the boot after coupling when said coupling mechanism is under tension.

23. The boot of claim 22 wherein the base comprises a polymeric substance.

24. The boot of claim 22 wherein the heel captivator includes a mesh with a plurality of holes.

25. The boot of claim 22 further comprising a lining underlying the heel captivator.

26. The boot of claim 22 wherein the coupling mechanism is a pivoting mechanism.

27. A hoof boot for placement on a hoof, the boot comprising:
- a base wherein the base at least partially covers lateral and anterior surfaces of the hoof;
- a longitudinal axis extending between the front and the back of the boot;
- wherein the base has sides and includes a front, a back, and a bottom;
- a cupped heel captivator wherein the cupped heel captivator includes forward lateral distal ends;
- a coupling mechanism for coupling the base to the forward lateral distal ends of the cupped heel captivator wherein the coupling mechanism includes at least one tension element wherein the tension element passes through at least one restriction point;
- wherein the at least one restriction point is located a distance at least 2 centimeters forward from the back of the base;
- wherein when coupled under tension, the coupling mechanism allows lateral movement of the cupped heel captivator relative to the longitudinal axis of the boot.

28. The boot of claim 27 wherein the at least one restriction point is located between a distance at least 4 centimeters rearward from the front and 2 centimeters forward from the back of the base.

29. The boot of claim 27 wherein the at least one restriction point is located a distance between 4 and 6 centimeters rearward from the front of the base.

30. The boot of claim 27 wherein the at least one restriction point is located a distance between 3 centimeters forward from the back of the base.

31. The boot of claim 27 wherein the at least one restriction point is located a distance rearward at least 50% of the distance between the front and the back.

32. The boot of claim 27 wherein the at least one restriction point is coupled to the side of the base.

33. The boot of claim 27 wherein the base comprises a polymeric substance.

34. The boot of claim 27 wherein the heel captivator includes a mesh with a plurality of holes.

35. The boot of claim 27 further comprising a lining underlying the heel captivator.

36. The boot of claim 27 wherein the heel captivator moves forward and relative to the base after coupling.

37. The boot of claim 27 wherein the heel captivator moves forward and backward relative to the base after coupling when said coupling mechanism is under tension.

38. The boot of claim 27 wherein the coupling mechanism is a pivoting mechanism.

* * * * *